E. S. ADAMS.
WIND SHIELD.
APPLICATION FILED JUNE 7, 1909.

962,406.

Patented June 28, 1910.

Witnesses
Frank G. Campbell
Carl Stoughton

Inventor
Edward S. Adams
By Chester C. Shepherd
Attorney

UNITED STATES PATENT OFFICE.

EDWARD S. ADAMS, OF COLUMBUS, OHIO.

WIND-SHIELD.

962,406.

Specification of Letters Patent.   Patented June 28, 1910.

Application filed June 7, 1909. Serial No. 500,668.

*To all whom it may concern:*

Be it known that I, EDWARD S. ADAMS, a citizen of the United States, residing at Columbus, in the county of Franklin and State of Ohio, have invented certain new and useful Improvements in Wind-Shields, of which the following is a specification.

This invention relates to wind shields for vehicles and more particularly to automobile wind shields, the object of the invention being to provide a device of this character adapted to be attached to the dash of an automobile and comprising a fixed bottom portion and an upper portion hingedly connected thereto in such manner that the upper hinged portion may be swung in either direction, to thereby adapt the device to be applied to varying makes of automobiles.

Figure 1:
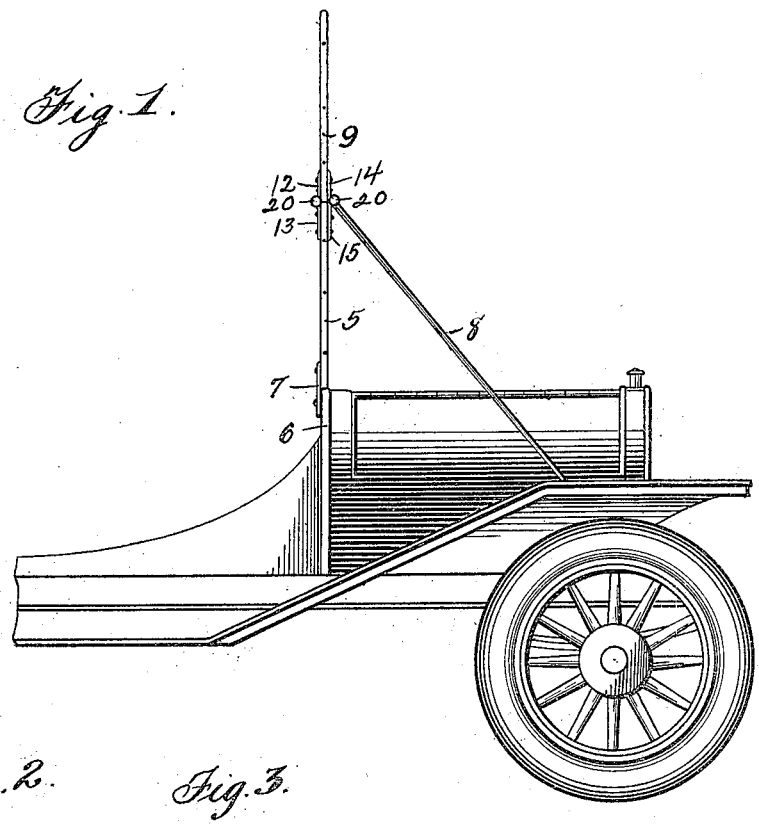
Figures 2, 3:
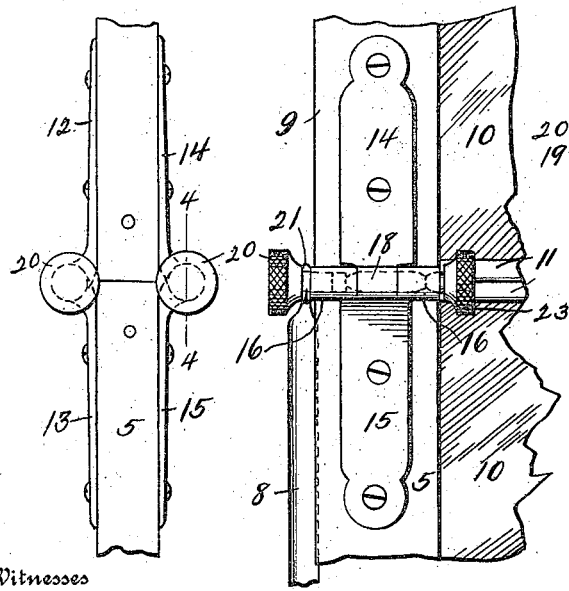
Figure 4:
Figure 5:
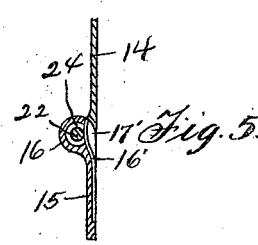

Further objects and advantages of the invention will be set forth in the detailed description which now follows:

In the accompanying drawing: Figure 1 is a side elevation of the front portion of an automobile, showing the invention applied thereto, Fig. 2 is an enlarged edge elevation illustrating the hinged joint between the upper and lower sections of the wind shield, Fig. 3 is a side elevation of the hinge joint, Fig. 4 is a vertical section upon line 4—4 of Fig. 2, and Fig. 5 is a section upon line 5—5 of Fig. 4.

Like numerals designate corresponding parts in all of the figures of the drawing.

Referring to the drawing, it will be seen that the wind shield comprises a lower fixed frame 5, that may be secured to the dash 6 of an automobile by clips 7 and braces 8. The upper frame section 9 of the wind shield, is hingedly connected to the lower section 5 thereof, and it is in the manner of hingedly connecting these two sections that the invention particularly resides. It is to be understood that the upper and lower frame sections carry sheets of glass, celluloid or other transparent material indicated at 10. Holders 11 extend across the lower edge of the upper section and the upper edge of the lower section and receive the edges of the transparent material as indicated in Fig. 3.

It is to be understood that the hinge structure now to be described, is duplicated at the opposite sides of the wind shield and since these hinge structures are exactly alike, only one has been shown. These hinge structures comprise hinge plates 12, 13, 14 and 15, the plates 12 and 13 lying upon the inner face of the shield and the plates 14 and 15 lying upon the outer face of the shield. The plates 13 and 15 have tubular extensions 16 between which tubular extensions 18, of the plates 12 and 14 lie in the usual manner of hinges of this character. It is by providing what are substantially removable pintles for these hinges, that renders it possible to break or swing the upper section of the wind shield in either direction.

By referring to Fig. 4, it will be seen that screws 19 having knurled heads 20 are threaded into the outer tubular extensions of each of the plates 13 and 15 and one of these screws binds in position the reduced end 21 of the brace 8. A pintle 22 having a knurled head 23 enters each of the inner tubular extensions of the plates 13 and 15 and passes through the tubular extensions 18 of the plates 12 and 14. These pintles have reduced portions 24 and 25 (see Fig. 4,) the metal rising gradually from the reduced portion 24. The reduced portion 25 terminates in an abrupt shoulder 26.

The lower hinge plates 13 and 15 carry spring tongues 16′ and are cut out at 17′ to permit said spring tongues to enter the inner tubular extension 16. These spring tongues therefore act as latches to hold the pintles 22 in position. When the shield is in use, these spring tongues lie in the reduced portions 24 of the pintles and hold the whole structure securely in position, but if it be desired to swing the portion 9 of the shield outwardly, the inner pintle upon each side of the shield, is withdrawn by pulling upon the knurled head 23 until the abrupt shoulder 26 strikes against the spring tongue. This withdraws the pintles from the tubular extensions 18 of the plates 12 and permits the shield to be swung over toward the front of the automobile or other vehicle.

If it be desired to swing the shield rearwardly, the outside pintles are withdrawn, as will be readily understood. The provision of the spring tongues and the abrupt shoulders 26 upon the pintles, prevents the complete withdrawal of said pintles and consequently prevents the accidental loss of said pintles.

It is apparent that by pulling out upon the spring tongues, so that both of the pintles may be removed and by disengaging the screws 19 from the braces 8, the entire upper section of the wind shield may be removed when desired.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claim.

What I claim, is:

A shield for automobiles comprising a fixed lower section and an upper section, a pair of interengaging hinge plates upon the front face of the shield at each side thereof, a pair of interengaging hinge plates upon each side of the shield at the rear face thereof, removable pintles for connecting said hinge plates, and means for preventing the complete withdrawal of said pintles from said hinge plates, said means comprising spring tongues adapted to enter reduced portions of said pintles.

In testimony whereof I affix my signature in presence of two witnesses.

EDWARD S. ADAMS.

Witnesses:
A. L. PHELPS,
L. CARL STOUGHTON.